April 3, 1956 J. F. COX 2,740,585

CRIBBAGE BOARD

Filed Nov. 26, 1954

INVENTOR.

John F. Cox

BY

Barlow & Barlow

ATTORNEYS.

2,740,585

CRIBBAGE BOARD

John F. Cox, Tiverton, R. I.

Application November 26, 1954, Serial No. 471,399

4 Claims. (Cl. 235—90)

This invention relates to scoring devices employing movable indicators and more particularly to a cribbage board.

Conventional cribbage boards usually employ round holes and round pegs, the holes being arranged in groups of five, sufficient groups of holes being provided so that a player may score up to 60. In the making of a pocket size cribbage board, the reduction of the size of the holes and pegs is usually proportionate from the standard size approved cribbage board. Thus, the pegs because of their relatively minute size are difficult to grasp to insert in the relatively small holes. This is particularly so when a peg to be moved is in a hole adjacent to the prior moved peg and the advance is but one or the next empty hole.

It is an object of the invention, therefore, to provide a cribbage board on a reduced scale in which the holes may be maintained more nearly the standard size.

It is another object of the invention to provide a cribbage board on a reduced scale in which the holes may be more closely spaced and still be free of the difficulty of grabbing pegs inserted in adjacent holes.

A still further object of the invention is to provide an arrangement of holes in a cribbage board so that pegs inserted in adjacent holes in a row will assume successively different angular relationships with respect to the vertical.

It is a more specific object of the invention to provide holes in a scoring device such as a cribbage board with at least one edge thereof angularly offset with respect to the vertical.

With these and other objects in view, the invention consists of certain novel features of construction as will be more fully described and particularly pointed out in the appended claims.

The invention is embodied in a cribbage board of the usual rectangular block construction in which there is provided two sets of sixty recesses or scoring holes. Each set is arranged in the usual two rows of groups of five holes with the holes in each row aligned with the holes in the other row. The holes according to the invention are formed along one side of each row with at least one straight side which will be vertical to the plane of the piece of material with the other side thereof varying in angular relationship to the vertical. The arrangement is such that adjacent holes do not have the same angle on one edge of the row thereof, thus allowing pegs placed in adjacent holes to assume different angles to each other. Preferably the edge of the holes facing the space between rows of each set are formed with a straight side, the opposite edge of certain holes being formed with angular sides, while other holes are formed with at least two straight sides, the arrangement being such that a hole with straight sides will be opposite to a hole having a side with the greatest inclination, while a hole having a side with a lesser inclination will be opposite a hole having a similar inclined side such that the included angle between the said sides of each pair of opposite holes in the row of each set will be equal to each other with no adjacent pair of said holes having the included angle disposed in the same direction. Thus, it will be observed that I have disclosed an arrangement of scoring holes which will permit closer spacing of the rows of holes as well as a closer spacing of the holes in the rows and yet still be relatively free of the usual difficulty of scoring or so-called pegging of cribbage boards of reduced size.

Figure 1:
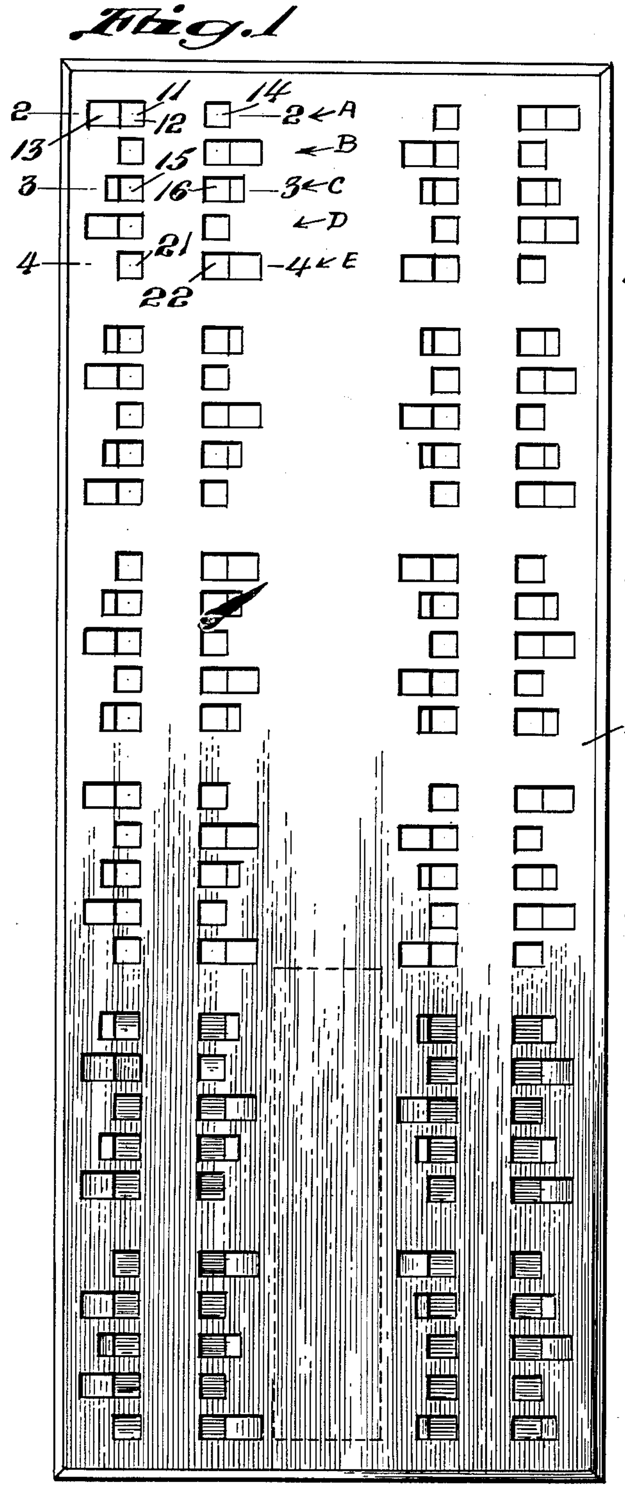
Figure 1 is a plan view of a scoring device such as a cribbage board in accordance with my invention.
Figure 2:
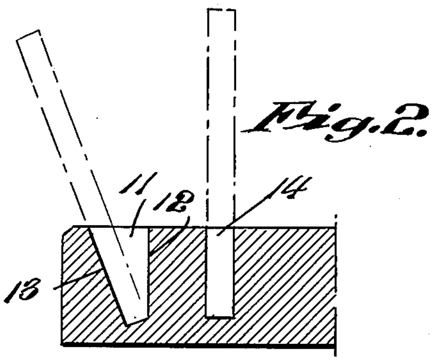
Figure 2 is a partial sectional view taken on lines 2—2 of Figure 1.
Figure 3:
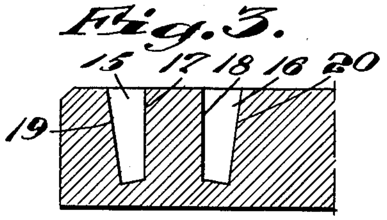
Figure 3 is a sectional view taken on lines 3—3 of Figure 1.
Figure 4:
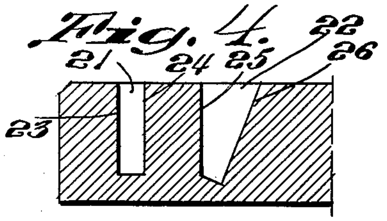
Figure 4 is a sectional view taken on lines 4—4 of Figure 1.

Referring now to the drawings, I have shown in Figure 1 a cribbage board or scoring device 10 of standard layout consisting of four rows of recesses or holes therein. These recesses or holes are formed in groups of five, thus resulting in four rows of six groups each. Assuming that the count will begin at station A, it will be seen that at this point I have provided a hole 11 which has a straight vertical side 12 and an angularly disposed side 13 (Figure 2). This angularly disposed side 13 at this station is arranged at 20° to the vertical or some other angle that will result in the arrangement to be described. Adjacent the hole 11 there is formed a second hole 14 which is provided with two vertically extending sides as seen in cross section. As viewed in the drawing, therefore, the holes or recesses at station A are provided on the left thereof with a hole that has a 20° angularly disposed side and an adjacent hole with a straight side. At the next station B the situation is reversed, the straight sided hole appearing on the left and the angularly disposed hole on the right. At station C, which is shown in cross section in Figure 3, two adjacent holes 15 and 16 are provided with straight vertical sides 17 and 18 and angularly related sides 19 and 20 which assume an angle of 10° to the vertical. Station D is a repeat of the configuration at station A, and station E is a repeat of the situation at station B. As will be seen in Figure 4, which represents the cross section at station E, there is disposed on the left of the drawing a hole or recess 21 and on the right thereof a hole or recess 22. Hole 21 is provided with two straight sides 23, 24, while hole 22 is provided with a straight side 25 and an angularly related side 26, side 26 assuming an angle of 20° to the vertical. Thus, when pegs are inserted in any of the adjacent holes in one row, it will be noted that they will assume different angles to the vertical, the bottom of the holes also being angled to aid in allowing the pegs to fall over, although they may be placed in the hole initially in a vertical attitude. Thus, in the left-hand row reading from the top of the drawing, the pegs will lie at the following angles to the vertical: 20°, 0°, 10°, 20°, 0° and so on in a repeating mathematical series. Additionally, it will be noted that the adjacent holes in the parallel rows such as 11 and 14, 15 and 16, and 21 and 22 have a 20° included angle between the pegs which might be inserted within them. This arrangement, therefore, allows easy access to pegs placed in adjacent holes in one row or in holes that may be adjacent in adjoining rows.

For ease in storing the pegs that are in use with the scoring device, a recess may be cut into the reverse side of the board as shown by dotted lines in Figure 1 with some suitable covering device such as a sliding door, tape, or other means (not shown) being provided to retain the pegs within the recess and thus aid in the portability of the device as a complete unit.

Figure 5:
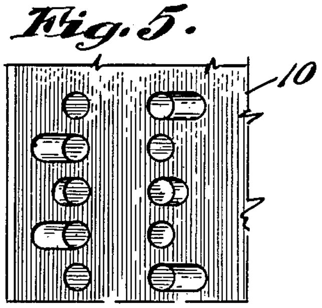
Figure 5 is a partial top plan view of a modified form of a cribbage board.

The holes, as shown in the drawing, have been provided as a square recess and it will be obvious to one skilled in the art that these may be made round, for instance as shown in Figure 5, without departing from the spirit of the invention as defined in the appended claims.

I claim:

1. A scoring device of generally rectangular shape comprising a pegging surface having a plurality of rows of recesses, a side of said recesses along one edge of each row being vertically disposed with respect to the plane of said board, the opposite side of each recess being disposed at varying angles to the surface of the device so that each successive recess has a different angle with respect to its adjacent recess in each row.

2. A cribbage board as in claim 1 wherein an acute angle is formed between the edges of the angularly disposed sides of the recesses of adjacent rows.

3. A scoring device having at least two rows of holes with the holes of one row in line with the holes in the other row, the edge of the holes facing the space between rows having a straight side and the opposite edge of adjacent successive holes having sides at varying angles to each other.

4. A scoring device as set forth in claim 3 wherein the sides of the said opposite edge of each pair of opposite holes form equal included angles.

References Cited in the file of this patent

UNITED STATES PATENTS

| | | |
|---|---|---|
| 1,153,761 | Carrill | Sept. 14, 1915 |
| 1,394,715 | Culver | Oct. 25, 1921 |